US009723409B2

(12) United States Patent
Smearcheck et al.

(10) Patent No.: US 9,723,409 B2
(45) Date of Patent: Aug. 1, 2017

(54) VEHICLE AUDIO SYSTEM

(71) Applicant: HONDA MOTOR CO., LTD., Tokyo (JP)

(72) Inventors: Matthew Adam Smearcheck, Dublin, OH (US); Andrew T. Goeppner, Dublin, OH (US); David Bryant, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 14/795,349

(22) Filed: Jul. 9, 2015

(65) Prior Publication Data

US 2017/0013353 A1 Jan. 12, 2017

(51) Int. Cl.

| | |
|---|---|
| ***H04B 1/00*** | (2006.01) |
| ***H04R 7/04*** | (2006.01) |
| *H04R 29/00* | (2006.01) |
| *H04R 31/00* | (2006.01) |

(52) U.S. Cl.

CPC ........... *H04R 7/045* (2013.01); *H04R 29/001* (2013.01); *H04R 31/003* (2013.01); *H04R 2440/05* (2013.01); *H04R 2499/13* (2013.01)

(58) Field of Classification Search

CPC .. H04R 2499/13; H04R 1/323; H04R 29/001; H04R 2201/028

See application file for complete search history.

(56) References Cited

U.S. PATENT DOCUMENTS

| | | | | |
|---|---|---|---|---|
| 5,008,944 | A | 4/1991 | Sels et al. | |
| 5,046,981 | A | 9/1991 | Roddy | |
| 5,137,322 | A | 8/1992 | Muirhead | |
| 6,674,219 | B1 | 1/2004 | Szilagyi et al. | |
| 8,155,344 | B2 * | 4/2012 | Iimori ................ | B60R 11/0217 381/86 |
| 8,208,655 | B2 | 6/2012 | Kim et al. | |
| 8,542,860 | B2 | 9/2013 | Scheel et al. | |
| 2005/0100174 | A1 * | 5/2005 | Howard .............. | B60R 11/0217 381/86 |
| 2006/0029240 | A1 | 2/2006 | Bank et al. | |
| 2008/0192953 | A1 | 8/2008 | Opfer | |
| 2008/0304680 | A1 | 12/2008 | Wilcox | |
| 2011/0200204 | A1 | 8/2011 | Horigome et al. | |
| 2011/0228949 | A1 | 9/2011 | Haba et al. | |

* cited by examiner

*Primary Examiner* — Regina N Holder

(74) *Attorney, Agent, or Firm* — Armstrong Teasdale LLP

(57) ABSTRACT

A vehicle audio system includes a vehicle panel having an inner surface and an outer surface defining an exterior surface of the vehicle. A transducer is mounted to the vehicle panel being configured to be connected to and operated by an amplifier. The transducer has a base mounted to the vehicle panel and causes the vehicle panel to vibrate and create an audio output.

21 Claims, 6 Drawing Sheets

VEHICLE AUDIO SYSTEM

BACKGROUND

The present disclosure relates generally to a vehicle audio system.

Vehicles include audio systems for listening to music or other audio output. The audio systems include speakers mounted in the interior cabin of the vehicle. When a vehicle operator is outside of the vehicle, such as tail-gating, working around the vehicle (e.g., doing yard work), camping, washing the vehicle, and the like, the audio options for the vehicle operator are limited. For example, the operator must either use portable speakers operated from a different source or must listen to the audio output over the in-cabin audio system with the windows down. However, the audio quality is limited in such situations because the speakers are directed into the interior of the vehicle making it difficult to hear the audio output. Additionally, in some situations, the operator may be unable to have the windows down or doors open, such as when washing the vehicle or working around the vehicle where the operator does not want water or debris inside the vehicle.

A need remains for an exterior audio system for a vehicle for providing audio output exterior of the vehicle.

BRIEF DESCRIPTION

In one embodiment, a vehicle audio system is provided including a vehicle panel having an inner surface and an outer surface defining an exterior surface of the vehicle. A transducer is mounted to the vehicle panel being configured to be connected to and operated by an amplifier. The transducer has a base mounted to the vehicle panel and causes the vehicle panel to vibrate and create an audio output.

In another embodiment, a vehicle audio system is provided for a truck having a truck bed defined by a first bed panel, a second bed panel and a third bed panel. The vehicle audio system includes a first transducer being configured to be operably coupled to a first channel of an amplifier. The first transducer has a base configured to be mounted to an inner surface of the first bed panel. The first transducer causes the first bed panel to vibrate and create an audio output. The vehicle audio system includes a second transducer configured to be operably coupled to a second channel of the amplifier. The second transducer has a base configured to be mounted to an inner surface of the second bed panel. The second transducer causes the second bed panel to vibrate and create an audio output. The first and second channels are independently controlled to obtain a desired audio output from first and second transducers.

In a further embodiment, a vehicle audio system for a vehicle is provided that includes a vehicle panel having an inner surface and an outer surface defining an exterior surface of the vehicle. The vehicle audio system includes a source unit producing an audio signal and an amplifier receiving the audio signal and providing at least one output based on the audio signal. The vehicle audio system includes an interior audio assembly having a speaker mounted within the cabin of the vehicle. The interior audio assembly is operably coupled to the amplifier and is configured to receive the at least one output from the amplifier to create audio output interior of the vehicle. The vehicle audio system includes an exterior audio assembly having a transducer mounted to the inner surface of the vehicle panel. The transducer is operably coupled to the amplifier and configured to receive the at least one output from the amplifier. The transducer has a base mounted to the inner surface of the vehicle panel. The transducer causes the vehicle panel to vibrate and create an audio output exterior of the vehicle.

DETAILED DESCRIPTION

Figure 1:
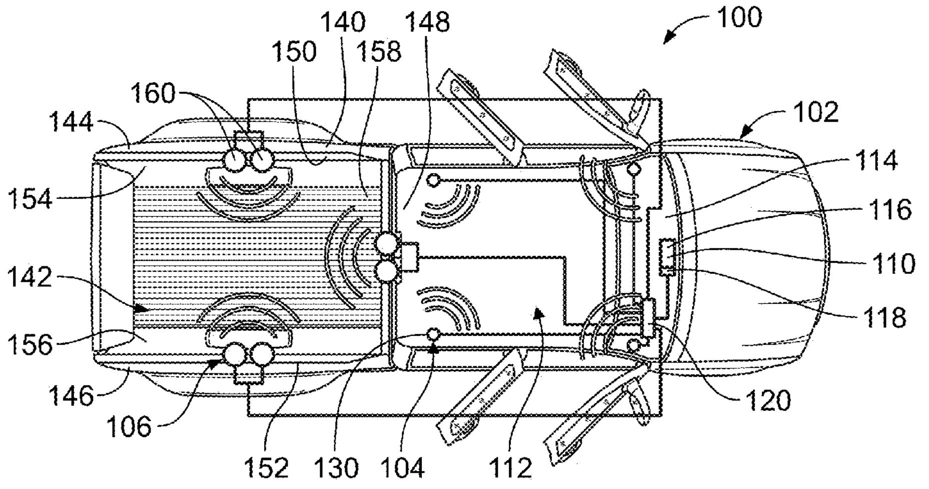
FIG. 1 is a schematic illustration of a vehicle audio system for a vehicle in accordance with an exemplary embodiment.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "module", "system," or "unit," may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of methods and systems for controlling functions of a vehicle audio system are provided. It should be noted that although the various embodiments are described in connection with the automotive industry, such as, but not limited to, a truck, one or more embodiments may be implemented in different types of vehicles, in different industries and for different applications. Additionally, while embodiments described herein refer to a vehicle audio system that provides audio output exterior of the vehicle, such as in a truck bed of the vehicle, the audio output may be provided at other areas of the vehicle in other various embodiments.

One or more embodiments include a system, which may be implemented as a programmable logic controller (PLC), also referred to as a programmable logic circuit that controls various functions and operations of the audio system of the vehicle, such as the audio input, the audio output, equalization of the audio output, such as to control frequency response of various speakers and/or transducers, such as to control bass, treble and the like, battery saving features, such as to turn off various electrical systems, and the like. The controller may control display functions on one or more display devices or screens.

In various embodiments, the system may include both interior audio assemblies (e.g., speakers in a cabin of the vehicle) and exterior audio assemblies (e.g., transducers outside of the cabin of the vehicle to produce audio output exterior of the vehicle cabin). The exterior audio assemblies provide a full range of audio output exterior of the vehicle, such as for use when people are around the outside of the vehicle. For example, during tailgating, while doing chores, while washing the vehicle and the like, the vehicle audio system may be used and does not need to rely on speakers inside the vehicle cabin to produce the sound. As such, the windows or doors do not need to be open to listen to the audio system.

FIG. 1 is a schematic illustration of a vehicle audio system 100 for a vehicle 102. In the illustrated embodiment, the vehicle 102 is a truck; however, other types of vehicles may be used in alternative embodiments. The vehicle audio system 100 includes at least one interior audio assembly 104 and at least one exterior audio assembly 106. Optionally, the vehicle audio system 100 may include only exterior audio assemblies 106 without any interior audio assemblies 104.

The vehicle audio system 100 includes a source unit 110 that produces an audio signal. In an exemplary embodiment, the source unit 110 is provided interior of a cabin 112 of the vehicle 102. The source unit 110 may be any type of source unit, such as an automotive radio, an infotainment system of the vehicle 102, or another type of source unit. The source unit 110 has at least one input to produce an audio signal, such as a radio, a CD player, a satellite radio, a digital music player, and the like.

Optionally, the source unit 110 may be provided in a front dashboard 114 of the vehicle. The source unit 110 may include a display 116 and one or more user inputs 118, such as buttons, dials, touch pads, and the like. Optionally, the display 116 may be a touch screen having one or more of the user inputs 118. The source unit 110 may be connected to and/or include other systems of the vehicle 102 such as a navigation system, a vehicle monitoring system, a battery monitoring system, a satellite system, a phone system, and the like.

The vehicle audio system 100 includes an amplifier 120 that receives the audio signal from the source unit 110. The amplifier 120 provides at least one output based on the audio signal. For example, the amplifier 120 may provide output to each interior audio assembly 104 and each exterior audio assembly 106. The amplifier 120 may be provided interior of the cabin 112. Optionally, the amplifier 120 may be part of the source unit 110. Optionally, the amplifier 120 may include one amplifier unit for the interior audio assembly 104 and a different amplifier unit for the exterior audio assembly 106. The amplifier units may be housed together within the same module or alternatively may be housed separately, such as in different parts of the vehicle 102.

The interior audio assemblies 104 each include an audio reproduction device, such as a speaker 130, mounted within the cabin 112 of the vehicle 102. The interior audio assemblies 104 are operably coupled to the amplifier 120. The interior audio assemblies 104 receive an output from the amplifier 120 to create audio output interior of the vehicle 102, such as within the cabin 112. The speakers 130 may be any type of speakers, such as standard automotive speakers. The speakers 130 may be mounted anywhere within the cabin 112, such as within the dashboard of the vehicle 102, in the doors of the vehicle 102, or elsewhere.

The vehicle 102 includes a plurality of body panels 140 that define various portions of the vehicle 102. For example, the body panels 140 may include the front end, the hood, the bumpers, the doors, the roof, the back end, the side panels, and the like. In an exemplary embodiment, the vehicle 102 is a truck and includes a truck bed 142. The truck bed 142 is defined by a driver side body panel 144, a passenger side body panel 146, and a head board body panel 148. A tailgate 149 may be provided opposite the head board body panel 148. The driver and passenger side body panels 144, 146 include wheel wells around the rear wheels of the vehicle 102. In an exemplary embodiment, the body panels 140 may be manufactured from composite materials and/or any other materials suitable for vehicle construction, such as metal. The body panels 140 may define exterior portions of the vehicle 102.

In an exemplary embodiment, the truck bed 142 includes a plurality of vehicle panels 150 defining the interior of the truck bed 142. The vehicle panels 150 may be fixed to corresponding body panels 140, which define the exterior of the truck bed 142. For example, the vehicle panels 150 may be positioned between the storage space of the truck bed 142 and the corresponding body panels 140. The vehicle panels 150 may be manufactured from a resin composite material, a metal matrix material or any other material suitable for vehicle construction. For example, the vehicle panels 150 may be manufactured from a steel reinforced composite material. The vehicle panels 150 may be more flexible than the body panels 140. The material of the vehicle panels 150 may have an elastic modulus considerably lower than steel. For example, the material of the vehicle panels 150 may have an elastic modulus at least 10% lower than steel. The vehicle panels 150 and/or body panels 140 may define bed rails 152 along the truck bed 142. For example, bed rails 152 may be provided along the side boards and head boards of the truck bed 142.

In an exemplary embodiment, the vehicle panels 150 include a driver side bed panel 154, a passenger side bed panel 156, and a head board bed panel 158. Optionally, exterior audio assemblies 106 are associated with each of the bed panels 154, 156, 158. The exterior audio assemblies 106 direct audio output into the truck bed 142. The audio output is created and directed exterior of the cabin 112 of the vehicle 102. In an exemplary embodiment, the exterior audio assemblies 106 use the vehicle panels 150 to create audio output. In an exemplary embodiment, the exterior audio assemblies 106 may provide a wide frequency range. For example, the exterior audio output is a full range of audio output. The exterior audio assemblies 106 may provide treble, mid-range and bass frequencies and/or any other frequency ranges therebetween. The full range of audio output may be from approximately 20 Hz to approximately 20 kHz, which is the approximate range of frequencies humans are able to hear; however the full range audio output may include a smaller subset of this frequency range. The full range audio output covers a sufficient frequency range for quality audio sound output, such as, but not limited to, music. "Full range" audio output may be defined as audio output in more than one recognized frequency range, such as treble and mid-range; mid-range and bass; treble and bass, and the like. Optionally, different exterior audio assemblies 106 may operate in different frequency ranges, which may or may not overlap.

In an exemplary embodiment, each exterior audio assembly 106 includes at least one transducer 160 mounted to the corresponding vehicle panel 150. The exterior audio assemblies 106 are operably coupled to the amplifier 120. The exterior audio assemblies 106 receive an output from the amplifier 120 to create audio output exterior of the vehicle 102. For example, the audio output may be directed into the truck bed 142. The audio output may propagate beyond the truck bed 142 for listening exterior of the vehicle 102. The transducers 160 may be mounted to any portion of the vehicle panels 150 that allow the vehicle audio system 100 to function as described herein. The transducers 160 cause an excited region of the vehicle panel 150 to vibrate and create the full range of audio output exterior of the vehicle 102. For example, the transducers 160 may be mounted to inner surfaces of the vehicle panels 150, such as between the vehicle panels 150 and the body panels 140. As such, the transducers 160 are protected from the harsh exterior environment of the truck bed 142.

Figure 2:
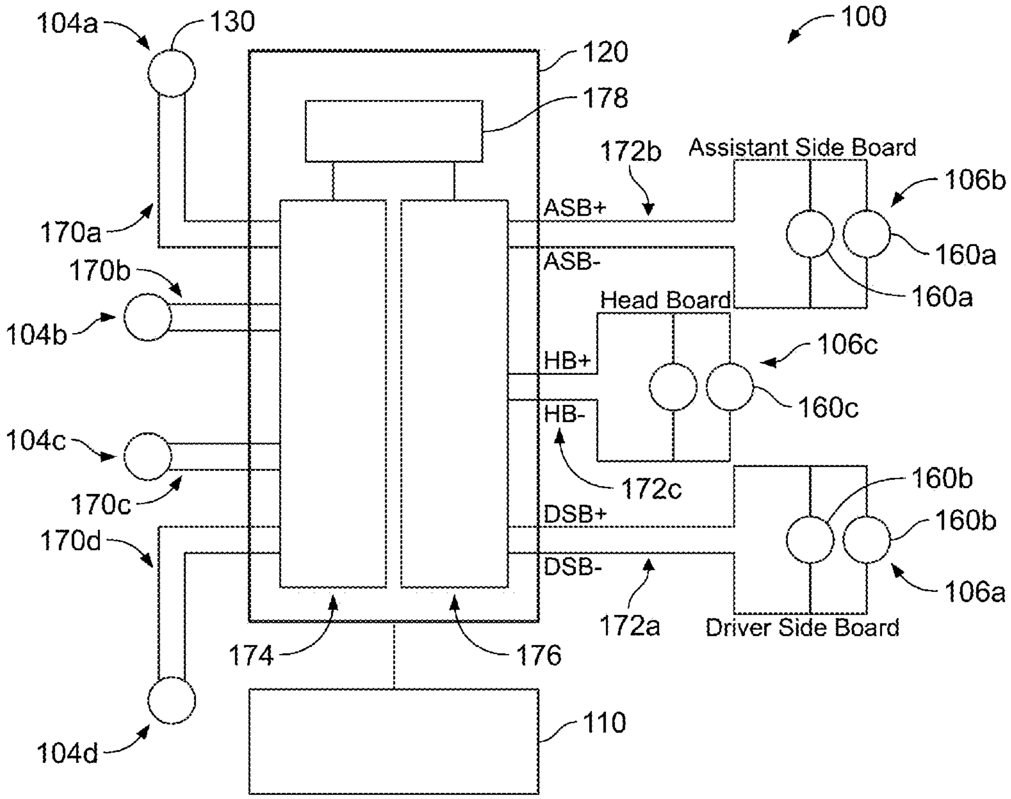
FIG. 2 is schematic illustration of the vehicle audio system showing various interior audio assemblies and exterior audio assemblies in accordance with an exemplary embodiment.

FIG. 2 is schematic illustration of the vehicle audio system 100 showing various interior audio assemblies 104 operably coupled to the amplifier 120 and various exterior audio assemblies 106 operably coupled to the amplifier 120. The source unit 110 provides a low power audio signal to the amplifier 120. In the illustrated embodiment, the amplifier 120 is configured to amplify the low power audio signal and to output higher power audio signals over a plurality of channels 170. Each interior audio assembly 104 (e.g., speaker 130*a*, 130*b*, 130*c*, 130*d*, etc.) is coupled to a corresponding channel 170*a*, 170*b*, 170*c*, 170*d*, etc. of the amplifier 120. Similarly, each exterior audio assembly 106*a*, 106*b*, 106*c* is coupled to a corresponding channel 172*a*, 172*b*, 172*c* of the amplifier 120. Each of the channels 170 has positive and negative terminals and corresponding conductors, such as wires, routed to the corresponding speakers 130 or transducers 160.

In an exemplary embodiment, the amplifier 120 includes an interior audio module 174 with the interior audio assemblies 104 coupled to the interior audio module 174 and an exterior audio module 176 with the exterior audio assemblies 106 coupled to the exterior audio module 176. Depending on the audio mode selected for the vehicle audio system 100, the amplifier 120 may power the interior audio module 174 and/or the exterior audio module 176. For example, when audio output is desired within the cabin 112, the interior audio module 174 is operated to power the interior audio assemblies 104. When exterior audio output is desired, the exterior audio module 176 is operated to power the exterior audio assemblies 106.

In an exemplary embodiment, each exterior audio assembly 106 includes a pair of transducers 160 electrically connected, such as connected in parallel or connected in series, with the positive and negative terminals of the corresponding channels 172. Any number of transducers 160 may be provided with each exterior audio assembly 106, including a single transducer 160 or multiple transducers 160. Each transducer 160 is operated to create audio output.

In an exemplary embodiment, each channel 172*a*, 172*b*, 172*c* may be independently controlled or tuned. For example, the transducers 160*a* associated with the driver side bed panel 154 may be tuned differently than the transducers 160*b* associated with the passenger side bed panel 156. The transducers 160*c* associated with the head board bed panel 158 may be tuned differently than the transducers 160*a*, 160*b*. Tuning of the transducers 160 may be performed by an equalizer 178 associated with the amplifier 120. The equalizer 178 may operate the various transducers 160 at different frequencies. For example, each channel 172*a*, 172*b*, 172*c* may be operated at a different frequency. The equalizer 178 controls the output of the channels 172 differently from each other. Optionally, the output of the amplifier 120 may be controlled by the equalizer 178 to achieve a desired sound quality target including, but not limited to, factors such as distortion, clarity and frequency response for each of the transducers 160. The equalizer 178 may control the output of the channels 172 based on various factors, such as the characteristics of the transducer 160, the mounting location of the transducer 160 to the vehicle panel 150, the shape and contour of the vehicle panel 150, the size of the vehicle panel 150, fixing locations of the vehicle panel 150 to the bed panel 140, and the like.

Figure 3:
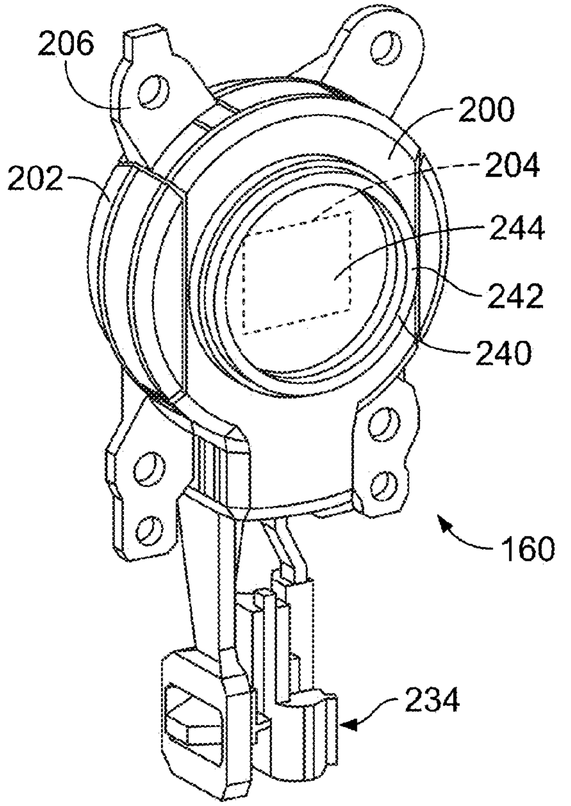
FIG. 3 is a bottom view of the transducer in an assembled state.
Figure 4:
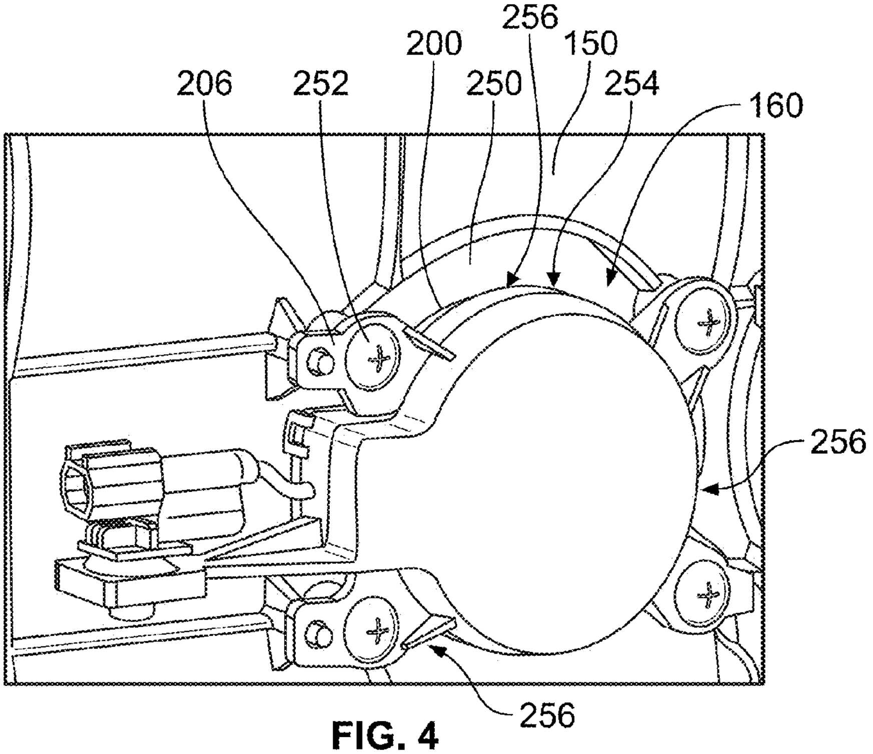
FIG. 4 illustrates the transducer mounted to a vehicle panel.

FIG. 3 is a bottom perspective view of the transducer 160 in accordance with an exemplary embodiment. FIG. 4 illustrates the transducer 160 mounted to the vehicle panel 150. The transducer 160 includes a base 200 and a cover 202 configured to be coupled to the base 200. A motor structure 204 (shown in phantom in FIG. 3) is received between the base 200 and cover 202. The motor structure 204 is excited using electric current supplied by the amplifier 120 (shown in FIG. 2) to vibrate the base 200, and thus vibrate the vehicle panel 150 to which the base 200 is mounted, to generate sound. The cover 202 and/or the base 200 may include mounting brackets 206 used to secure the transducer 160 to the vehicle panel 150. For example, fasteners, such as threaded screws, may be used to secure the mounting brackets 206 to the vehicle panel 150. The cover 202 and/or base 200 may define a cavity that receives the motor structure 204.

The motor structure 204 may include a voice coil or other component that receives the electric current. The motor structure 204 includes a frame and/or suspension that is used to secure the motor structure 204 within the base 200 and/or cover 202. A movable component, such as a magnet, is excited by the voice coil with the electric current. The movable component starts vibrating or oscillating with the frequency of the applied signal. The oscillation is transmitted or transferred to the base 200 and from there to the vehicle panel 150. An electrical connector 234 is coupled to the voice coil and is used to electrically connect the voice coil to the conductors, such as the wires, of the channel 172 routed to the amplifier 120. Other types of motor structures 204 having other components may be used in alternative embodiments.

In an exemplary embodiment, the base 200 includes a rim 240. The rim 240 has an abutment surface 242 configured to abut against the vehicle panel 150. The rim 240 surrounds a center plate 244 and is raised from the center plate 244 such that the center plate 244 is configured to be spaced from the vehicle panel 150. Oscillation of the motor structure 204 is transferred to the base 200 and is transferred from the base 200 to the vehicle panel 150, such as through the rim 240. Oscillation of the motor structure 204 may also be transferred from the cover 202 to the vehicle panel 150 through the mounting brackets 206. The base 200 and/or cover 202 may have other features that provide intentional, permanent surface contact between the transducer 160 and the vehicle panel 150 to transfer the oscillation energy of the motor structure 204 in other various embodiments.

The base 200 is mounted against an inner surface 250 (FIG. 4) of the vehicle panel 150. Fasteners 252 are used to fix the mounting brackets 206 to a mounting location 254 of the vehicle panel 150. The rim 240 abuts against the inner surface 250 and causes the vehicle panel 150 to vibrate. An excited region 256 of the vehicle panel 150, which is the region around the mounting location 254, vibrates causing the vehicle panel to emit the audio output, such as the voice or music audio output. Optionally, one or more areas of the vehicle panel 150 may be weakened (e.g., thinned or manufactured from a different material) and/or one or more areas of the vehicle panel 150 may be strengthened (e.g., thickened or manufactured from a different material) to control and induce vibration of the excited region 256. The contour of the vehicle panel 150 may control and induce vibration of the excited region 256.

Figure 5:
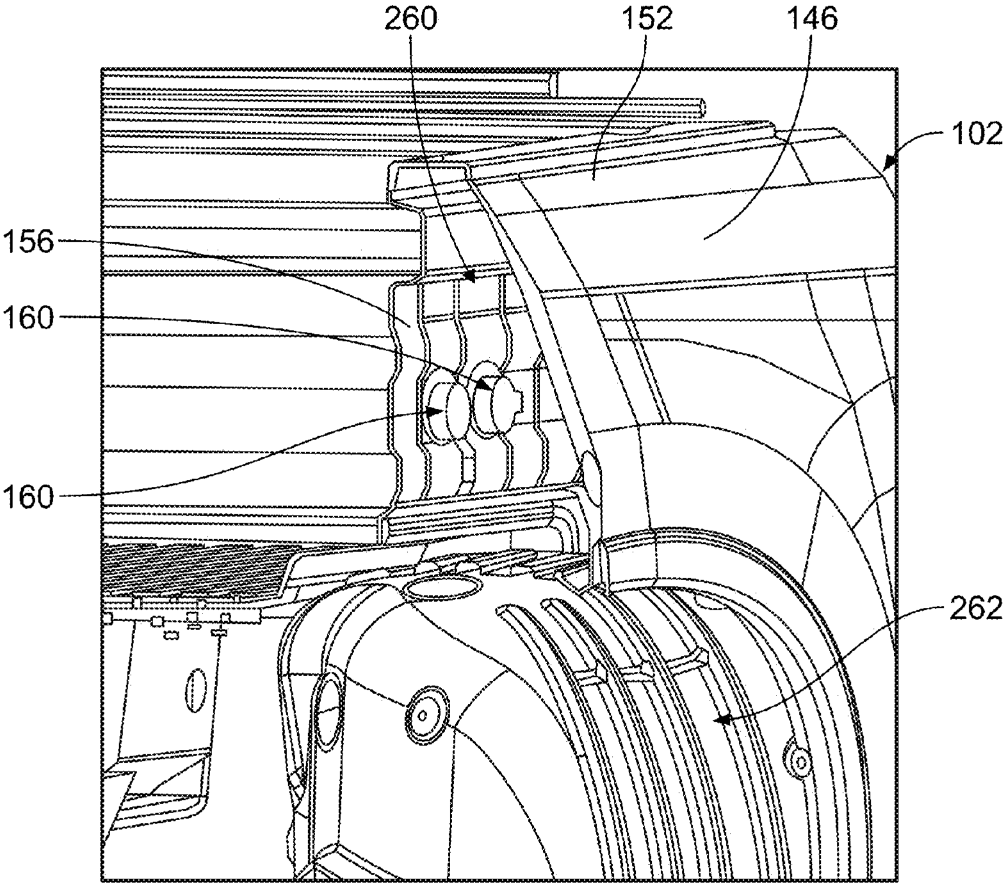
FIG. 5 is a partial sectional view of a portion of the vehicle showing a pair of transducers mounted to a vehicle panel.

FIG. 5 is a partial sectional view of a portion of the vehicle 102 showing a pair of transducers 160 mounted to the passenger side bed panel 156. The bed rail 152 is defined by the passenger side bed panel 156 and the passenger side body panel 146. A cavity 260 is defined between the passenger side bed panel 156 and the passenger side body panel 146. The transducers 160 are mounted in the cavity 260. The transducers 160 are protected from the environment in the cavity 260. A wheel well 262 is provided between the passenger side bed panel 156 and the passenger side body panel 146.

Figure 6:
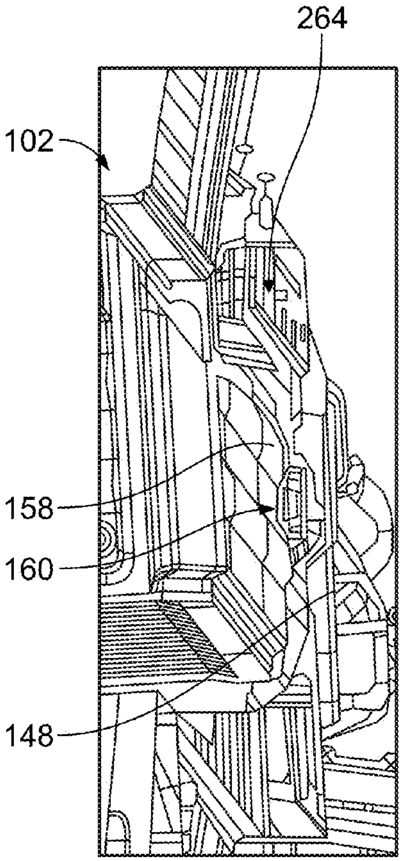
FIG. 6 is a partial sectional view of a portion of the vehicle showing one of the transducers mounted to a vehicle panel.
Figure 7:
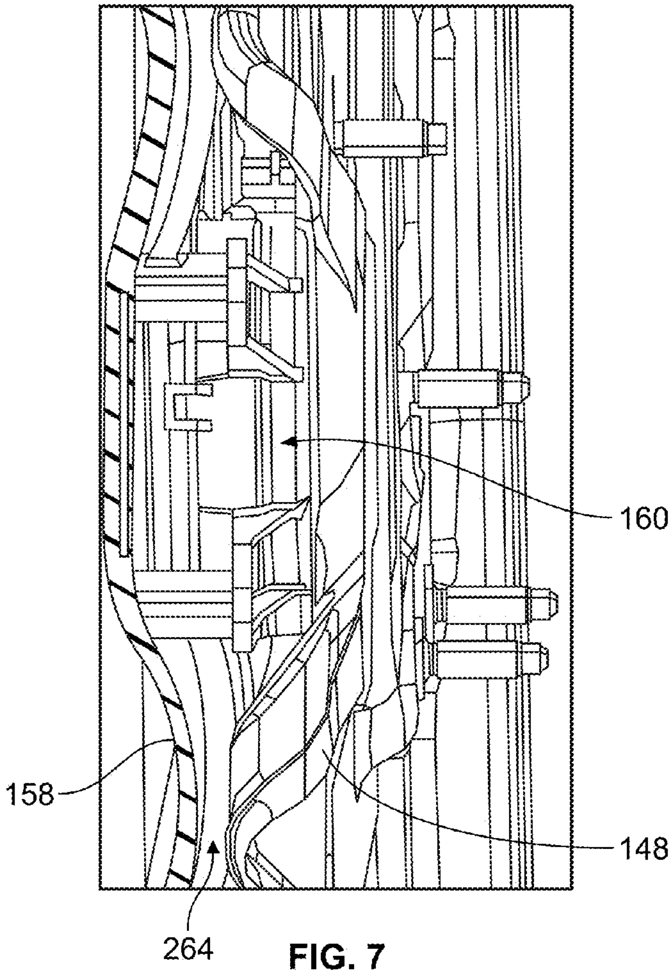
FIG. 7 is an enlarged view of a portion of the vehicle and transducer shown in FIG. 6.

FIG. 6 is a partial sectional view of a portion of the vehicle 102 showing one of the transducers 160 mounted to the head board bed panel 158. FIG. 7 is an enlarged view of a portion of the vehicle 102 shown in FIG. 6. A cavity 264 is defined between the head board bed panel 158 and the head board body panel 148. The cavity 264 may have variable thicknesses at different locations. At fixing locations, where the head board bed panel 158 is securely coupled or fixed to the head board body panel 148, the thickness may be negligible. Clearance is provided between the transducers 160 and the head board body panel 148 to ensure that the vibration of the transducers 160 is unrestricted. The transducers 160 are mounted in the cavity 264. The transducers 160 are protected from the environment in the cavity 264.

Figure 8:
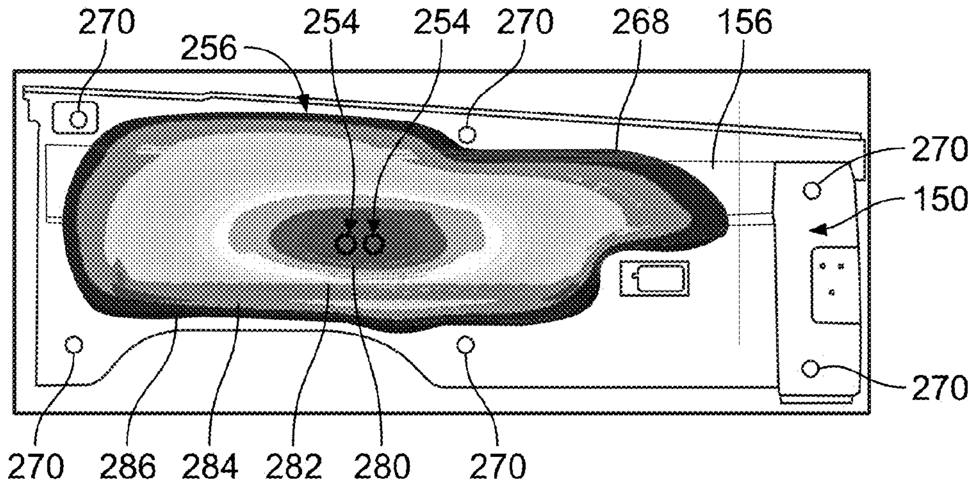
FIG. 8 illustrates an exterior surface of a vehicle panel showing an excited region of the vehicle panel in accordance with an exemplary embodiment.

FIG. 8 illustrates an exterior surface 268 of the passenger side bed panel 156 (i.e., the surface that faces the truck bed 142). FIG. 8 shows the excited region 256 surrounding the mounting locations 254 of the pair of transducers 160. FIG. 8 also illustrates fixing locations 270 of the passenger side bed panel 156, which are the locations where the panel 156 is securely coupled or fixed to the corresponding body panel 140 (shown in FIG. 1). Optionally, the mounting locations 254 may be approximately equidistant from nearest fixing locations 270 to allow a significant distance from the fixed portions of the panel 156, which may allow a greater amount of vibration of the panel 156 than embodiments where the mounting locations 254 are near the fixing locations 270. For example, the mounting locations 254 may be located at a position that provides a maximum physical displacement of the panel 156 when excited. The passenger side bed panel 156 may be shaped differently than the driver side bed panel 154 (shown in FIG. 1) and may have different mounting locations 254, fixing locations 270, contours, and the like. The side bed panels 154, 156 may have different shapes, mounting locations 254, fixing locations 270, contours, and the like than the head board bed panel 158.

Different areas of a given panel 156 will be displaced different amounts when the panel 156 is subjected to vibrations having a predefined frequency. The position of mounting locations 254 may be chosen based at least partially on the amount of panel displacement caused by the application of the vibrations having the predefined frequency. For example, the positions on passenger side bed panel 156 chosen for mounting locations 254 may be the positions where the displacement created by applying vibrations having the predefined frequency to the passenger side bed panel 156 is a maximum. Positioning the transducers 160 at such positions creates a desirable physical displacement of the panel 156 when excited. The predefined frequency may be a frequency considered valuable to generation of desirable sound quality. Alternatively, or in combination, the predefined frequency may be a vibration frequency that causes a high or maximum displacement within the panel. The mounting locations 254 may also be determined based on the shape of the panel 156 (e.g., the perimeter shape, any contours, and the like), the number of the transducers 160, the number and positioning of the fixing locations 270, the proximity of the transducers to the fixing locations 270, and the like. Optionally, the mounting locations 254 may be selected based on the contour of the panel 156 or other factors to enhance and control the vibration pattern of the panel 156 to control the audio output from the panel 156. Optionally, the vehicle panels 150 may be shaped to enhance the direction, intensity and/or quality of the sound. The excited region 256 is the region of the vehicle panel 150 that oscillates to create sound and may include various areas 280, 282, 284, 286 within the excited region 256, which may have different intensity or create different sound. The shape of the excited region 256 is affected by the shape of the panel 156.

Figure 9:
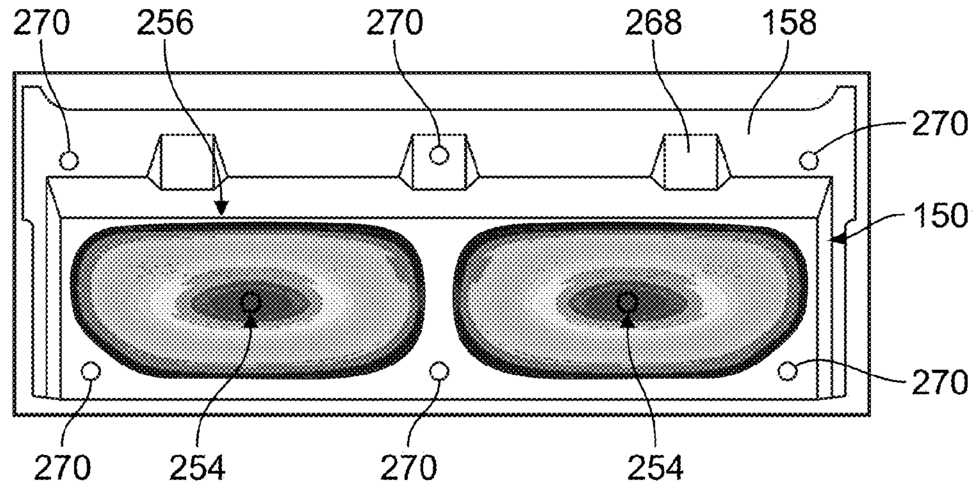
FIG. 9 illustrates an exterior surface of a vehicle panel showing an excited region of the vehicle panel in accordance with an exemplary embodiment.

FIG. 9 illustrates an exterior surface 268 of the head board bed panel 158 (i.e., the surface that faces the truck bed 142). In the illustrated embodiment, two transducers 160 are mounted to head board bed panel 158 at mounting locations 254; however, any number of transducers 160 may be used. The mounting locations 254 are separated from each other, such as on opposite sides of a centerline of the head board bed panel 158. Optionally, the mounting locations 254 may be approximately centered between the centerline and the outer edges of the panel 158. In an alternative embodiment, the transducers 160 may be co-located as closely as possible to practically act as a singular source of excitation. FIG. 9 also illustrates fixing locations 270 of the panel 158, which are the locations where the panel 158 is securely coupled or fixed to the corresponding body panel 140 (shown in FIG. 1). Desired positions for mounting locations 254 on panel 158 are determined in the same manner described above with respect to FIG. 8.

It is realized that different transducers 160 may have different frequency responses and thus different sound pressure levels. The transducer 160 may produce frequencies at between approximately 20 Hz and approximately 20 kHz. The sound pressure level may be different when the truck bed 142 is empty as compared to when the truck bed has cargo therein. The sound pressure level at the various frequencies may be lower, as expected, when the truck bed is full; however, the vehicle audio system 100 is still able to produce quality, audible sound across a full range of frequencies even when the truck bed 142 is full.

Figure 10:
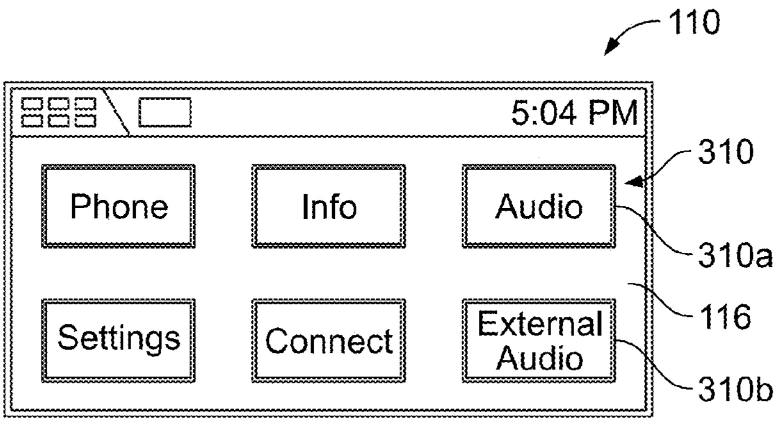
FIG. 10 illustrates a source unit of the vehicle audio system showing exemplary display icons on a display.

FIG. 10 illustrates the source unit 110 showing exemplary display icons 310 representing selectable function modes (or audio sources) and/or function controls of the vehicle audio system 100 on the display 116. The display 116 may display the virtual buttons or display icons 310, which may be touched by the user of the vehicle to control the vehicle audio system 100. For example, the display icons 310 may include an audio icon 310*a*, which may allow the user to change audio inputs or sources, such as from the AM/FM radio, a CD player, satellite radio, a digital music player, and the like.

The display icons 310 may include an external audio icon 310*b*, such as a truck bed audio icon, which may allow the user to turn on the external audio system. Other icons may be displayed and they may be displayed in any arrangement that allows the vehicle audio system 100 to function as described herein.

The source unit 110 may be or include a computing device, and may include a memory, a transceiver, a processor and the like. The processor may include one or more conventional electronic processors that interpret and execute instructions. The memory may include a random access memory (RAM), a read-only memory (ROM), and/or another type of dynamic or static storage device that stores information and instructions for execution by the processor. The RAM, or another type of dynamic storage device, may store instructions as well as temporary variables or other intermediate information used during execution of instructions by the processor. The ROM, or another type of static storage device, may store static information and instructions for the processor. The transceiver may communicate with the processor via a communication line, and may communicate wirelessly or via a wired connection with another device, such as a mobile phone, a cellular network, a satellite network, or other communication device. The source unit 110 may have a dedicated control module or unit configured to process the control inputs and/or to process the data to be displayed on the display 116 and to control the audio output.

The source unit 110 may have a home menu or main menu having display icons 210 corresponding to the various functions and sub-systems, including audio sub-systems. The user may activate control of one of the sub-systems, such as to control different audio inputs or sources, such as the AM/FM radio, a CD player, satellite radio, a digital music player, and the like.

Figure 11:
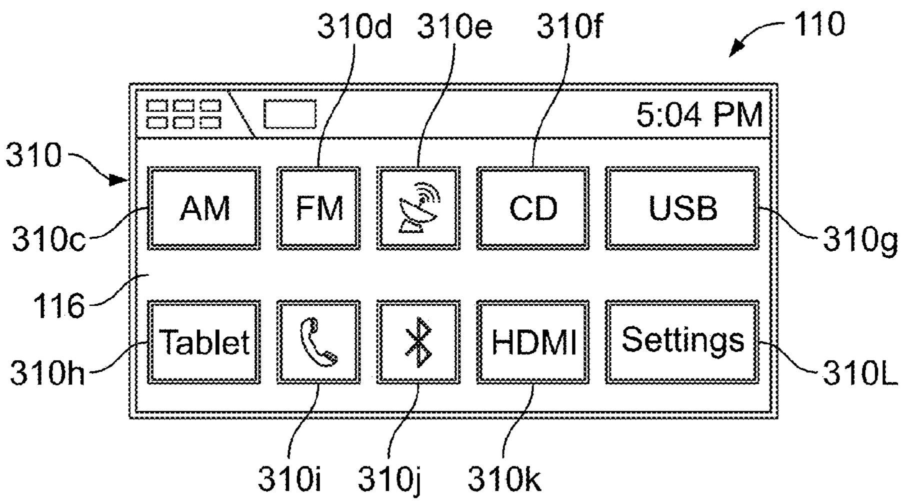
FIG. 11 illustrates the source unit showing exemplary display icons.

FIG. 11 illustrates the display 116 showing exemplary display icons 310 representing selectable function controls associated with the vehicle audio system 100. For example, the source unit 110 may have display icons 310 representing FM output 310*c*, AM output 310*d*, satellite radio output 310*e*, CD output 310*f*, auxiliary USB output 310*g*, iPod® output 310*h* (iPod is a registered trademark of Apple Inc. of Cupertino, Calif.), mobile device output 310*i*, Bluetooth® output 310*j*, auxiliary HDMI output 310*k*, settings 310*l*, and the like. Such arrangement of selectable control functions may represent an audio output menu that presents the user with the ability to access further controls of the audio system, such as station selection, song selection, volume control, tune control, seek control, scan control and the like via a new menu. Other types of icons may be presented in other embodiments, and such display icons may correspond to non-audio functions, such as climate control functions, or other vehicle sub-systems.

Figure 12:
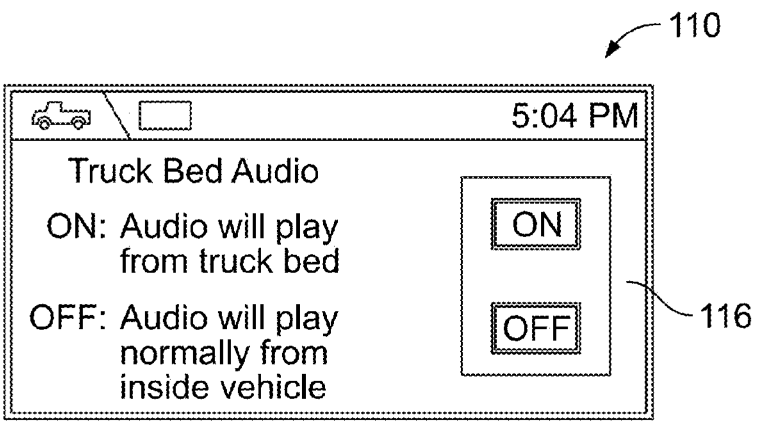
FIG. 12 illustrates the source unit showing an exemplary display.

FIG. 12 illustrates the source unit 110 showing an exemplary display after the external audio icon 310*b* is selected. The source unit 110 may prompt the operator of the vehicle to control the external audio system by presenting an ON button and an OFF button. Once the operator turns on the external audio system, the source unit 110 may control, or may cause one or more other controllers to control, other systems of the vehicle. For example, because the external audio system is typically operated when the operator is outside of the vehicle, internal systems may not be necessary. Optionally, the source unit 110 may shut off the internal audio system when the external audio system is operated. Optionally, the external audio system may not be operated unless the vehicle 102 is in park. For example, the user may not be able to select the external audio icon 310*b* unless the vehicle 102 is in park. In other embodiments, the source unit 110 may restrict operation of the external audio system to when the vehicle 102 is stopped or is moving below a predefined speed, such as when the vehicle 102 is moved from spot to spot to unload portions of the contents in the truck bed at the different spots.

When the engine is off, the source unit 110 may turn off unnecessary sub-systems or components of the vehicle 102, such as to conserve battery power. For example, the source unit 110 may turn off the display 116. Optionally, the display 116 may be automatically shut off after a predetermined time period, such as 1 minute. The source unit 110 may include a timer to control shutting off of one or more systems or components. The source unit 110 may cause lighting systems to shut off. The source unit 110 may cause climate control systems to shut off. The source unit 110 may cause other background electrical systems to turn off, such as systems connected by the vehicles controller area network (CAN), which may include, but is not limited to, the transmission system, the ABS system, the airbag system, or other systems.

In an exemplary embodiment, the source unit 110 itself, or another system, monitors the battery level or battery state of the battery of the vehicle. For example, the battery monitor may determine if a battery voltage is above a predefined threshold voltage level, which is at a level above which the battery needs to start the vehicle 102. When the battery state is at the threshold battery state, the source unit 110 may turn off the external audio system. Optionally, the source unit 110 may provide an indication to the user that the external audio system is about to be shut off. For example, an audible indicator may be transmitted through the external audio system. A visual indicator, such as a message on the display 116, may be provided indicating that the external audio system will be shut down, such as after 30 seconds unless the vehicle is restarted.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A vehicle audio system for a vehicle comprising:

a vehicle panel having an inner surface, an outer surface defining an exterior surface of the vehicle, and a plurality of predetermined locations for fixing the vehicle panel to a body panel of the vehicle; and a transducer mounted to the vehicle panel, the transducer being configured to be connected to and operated by an amplifier, the transducer having a base mounted to the vehicle panel at a mounting location, the transducer causing the vehicle panel to vibrate and create an audio output exterior of the vehicle, wherein the mounting location is remote from each of the plurality of predetermined locations.

2. The vehicle audio system of claim 1, wherein the mounting location is located at a position that provides a maximum physical displacement of the vehicle panel when excited.

3. The vehicle audio system of claim 1, further comprising a second transducer mounted to the inner surface of the vehicle panel.

4. The vehicle audio system of claim 1, wherein the vehicle panel is secured to the body panel such that a cavity is formed between the body panel and the vehicle panel, the transducer being located in the cavity.

5. The vehicle audio system of claim 1, wherein the vehicle panel is a resin composite material.

6. The vehicle audio system of claim 1, wherein the vehicle panel comprises at least one of a head board and a side board of a truck bed, the outer surface defining the truck bed, the audio output being directed into the truck bed.

7. The vehicle audio system of claim 1, wherein the amplifier is operated to control audio output from speakers interior of a cabin of the vehicle in addition to the transducer exterior of the cabin of the vehicle.

8. A vehicle audio system for a truck having a truck bed defined by a first bed panel, a second bed panel and a third bed panel, the first bed panel shaped differently than the second bed panel, the vehicle audio system comprising:

a first transducer being configured to be operably coupled to a first channel of an amplifier, the first transducer having a base configured to be mounted to an inner surface of the first bed panel, the first transducer causing the first bed panel to vibrate and create an audio output; and a second transducer being configured to be operably coupled to a second channel of the amplifier, the second transducer having a base configured to be mounted to an inner surface of the second bed panel, the second transducer causing the second bed panel to vibrate and create an audio output;

wherein the first and second channels are independently controlled to obtain a desired audio output from the vehicle audio system, and wherein an output of the first channel is controlled differently than an output of the second channel based on the shape of the first bed panel and the second bed panel.

9. The vehicle audio system of claim 8, further comprising a third transducer being configured to be operably coupled to a third channel of the amplifier, the third transducer having a base configured to be mounted to an inner surface of the third bed panel of the vehicle, the third transducer causing an excited region of the third bed panel to vibrate and create a full range of audio output, the third transducer being independently tunable from the first and second transducers.

10. The vehicle audio system of claim 8, wherein the amplifier includes an equalizer to control output of the first channel differently than the output of the second channel.

11. The vehicle audio system of claim 10, wherein the outputs of the first and second channels are individually controlled by the equalizer to achieve predefined distortion targets, clarity targets, and frequency targets for each of the first and second transducers.

12. The vehicle audio system of claim 8, further comprising a first speaker interior of a cabin of the truck, the first speaker being operably coupled to the amplifier.

13. The vehicle audio system of claim 8, wherein the amplifier is controlled by a source unit interior of a cabin of the truck, the source unit being operably coupled to the amplifier.

14. A vehicle audio system for a vehicle comprising:

a first vehicle panel and a second vehicle panel, each of the first and second vehicle panels having an inner surface and an outer surface, the outer surface defining an exterior surface of the vehicle, the first vehicle panel shaped differently than the second vehicle panel;

a source unit producing an audio signal;

an amplifier receiving the audio signal and providing at least one output based on the audio signal;

an interior audio assembly comprising a speaker mounted within the cabin of the vehicle, the interior audio assembly being operably coupled to the amplifier and configured to receive the at least one output from the amplifier to create audio output interior of the vehicle;

an exterior audio assembly comprising:

a first transducer having a base mounted to the inner surface of the first vehicle panel, the first transducer being operably coupled to a first channel of the amplifier and configured to receive the at least one output from the amplifier; and a second transducer having a base mounted to the inner surface of the second vehicle panel, the second transducer being operably coupled to a second channel of the amplifier and configured to receive the at least one output from the amplifier, the first and second transducers causing the respective first and second vehicle panels to vibrate and create an audio output exterior of the vehicle;

wherein an output of the first channel is controlled differently than an output of the second channel based on the shape of the first vehicle panel and the second vehicle panel.

15. The vehicle audio system of claim 14, wherein the source unit is provided in a front dashboard of the vehicle and controls operation of the amplifier.

16. The vehicle audio system of claim 14, wherein the amplifier restricts output to the interior audio assembly when transmitting the at least one output to the exterior audio assembly.

17. The vehicle audio system of claim 14, wherein the source unit determines if the vehicle is in park and provides the at least one output to the external audio assembly only when the vehicle is in park.

18. The vehicle audio system of claim 14, wherein the source unit determines a speed of operation of the vehicle and provides the at least one output to the external audio assembly only when the vehicle is stopped or operating below a predefined speed.

19. The vehicle audio system of claim 14, wherein the source unit shuts down at least one background electrical system when the at least one output is provided to the exterior audio assembly.

20. The vehicle audio system of claim 14, wherein the source unit includes a display, the display being operated on a timer to shut off the display after a predetermined time when the at least one output is provided to the exterior audio assembly.

21. The vehicle audio system of claim 14, further comprising a battery monitor, the battery monitor determining a battery state of the vehicle, the battery monitor causing the source unit to shut off if the battery state is below a threshold battery state.

* * * * *